US010803036B2

(12) United States Patent
Ruan

(10) Patent No.: US 10,803,036 B2
(45) Date of Patent: Oct. 13, 2020

(54) NON-TRANSITORY COMPUTER-READABLE STORAGE MEDIUM, DATA DISTRIBUTION METHOD, AND DATA DISTRIBUTION DEVICE

(71) Applicant: FUJITSU LIMITED, Kawasaki-shi, Kanagawa (JP)

(72) Inventor: Ke Ruan, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 450 days.

(21) Appl. No.: 15/679,807

(22) Filed: Aug. 17, 2017

(65) Prior Publication Data
US 2018/0052875 A1    Feb. 22, 2018

(30) Foreign Application Priority Data
Aug. 22, 2016  (JP) ................. 2016-161977

(51) Int. Cl.
*G06F 16/22* (2019.01)
*G06F 16/28* (2019.01)
(Continued)

(52) U.S. Cl.
CPC .......... *G06F 16/2228* (2019.01); *G06F 3/061* (2013.01); *G06F 3/0617* (2013.01);
(Continued)

(58) Field of Classification Search
CPC .. G06F 17/2785; G06F 16/285; G06F 16/904; G06F 16/90335; G06F 16/2228;
(Continued)

(56) References Cited

U.S. PATENT DOCUMENTS 9,015,812 B2 * 4/2015 Plattner ............... G06F 21/6245
726/4
9,306,870 B1 * 4/2016 Klein ................ H04L 29/06176
(Continued)

FOREIGN PATENT DOCUMENTS

| JP | 5-12085 A | 1/1993 |
| JP | 7-85069 A | 3/1995 |
| JP | 2008-225686 A | 9/2008 |
| JP | 2013-156960 A | 8/2013 |

OTHER PUBLICATIONS

Office Action dated May 12, 2020, issued in counterpart JP application No. 2016-161977, with English translation. (8 pages).

*Primary Examiner* — Angelica Ruiz
(74) *Attorney, Agent, or Firm* — Westerman, Hattori, Daniels & Adrian, LLP

(57) ABSTRACT

A non-transitory computer-readable storage medium storing a data distribution program that causes a computer to execute a process, the process including calculating a first value relating to a data amount of a specified information processing device included in a plurality of information processing devices, each of a plurality of pieces of data being stored in any of the plurality of information processing devices, when the first value exceeds a reference, calculating each of a plurality of data amounts of a plurality of data groups for each of a plurality of classification conditions, selecting a specified classification condition from the plurality of classification conditions based on the plurality of data amounts, and distributing, to another information processing device included in the plurality of information processing devices, any of the plurality of data groups classified based on the specified classification condition.

9 Claims, 16 Drawing Sheets

(51) Int. Cl.
*G06F 3/06* (2006.01)
*H04L 29/08* (2006.01)

(52) U.S. Cl.
CPC ........ *G06F 16/285* (2019.01); *H04L 67/1095* (2013.01); *H04L 67/1097* (2013.01); *H04L 29/0854* (2013.01); *H04L 67/2842* (2013.01)

(58) Field of Classification Search
CPC ............. G06F 16/24568; G06F 16/284; G06F 16/287; G06F 16/35
USPC ........... 707/600–831, 899, 999.001–999.206
See application file for complete search history.

(56) References Cited

U.S. PATENT DOCUMENTS

| | | | |
|---|---|---|---|
| 2008/0253608 A1* | 10/2008 | Long | G06K 7/14 |
| | | | 382/100 |
| 2009/0006467 A1* | 1/2009 | Visscher | G06Q 10/06 |
| 2009/0172035 A1* | 7/2009 | Lessing | G06F 16/284 |
| 2009/0254572 A1* | 10/2009 | Redlich | G06Q 10/06 |
| 2010/0010968 A1* | 1/2010 | Redlich | G06Q 10/00 |
| | | | 707/E17.014 |
| 2013/0198198 A1 | 8/2013 | Tsuchimoto | |
| 2015/0263987 A1* | 9/2015 | Klein | H04L 29/08 |
| | | | 709/226 |
| 2015/0363481 A1* | 12/2015 | Haynes | G06Q 10/10 |
| | | | 707/748 |

\* cited by examiner

FIG. 3

DATA

| KEY | VALUE (OBJECT) |
|---|---|

| ATTRIBUTE 1 | ATTRIBUTE VALUE 1 |
|---|---|
| ATTRIBUTE 2 | ATTRIBUTE VALUE 2 |
| ... | ... |
| ... | ... |
| ATTRIBUTE M | ATTRIBUTE VALUE M |

FIG. 15

| | JAN. | FEB. | MAR. | APR. | MAY. | JUN. | JUL. | AUG. | SEP. | OCT. | NOV. | DEC. |
|---|---|---|---|---|---|---|---|---|---|---|---|---|
| ATTRIBUTE 1 | 0.23 | 0.71 | 0.88 | 0.63 | 0.52 | 0.84 | 0.32 | 0.40 | 0.54 | 0.23 | 0.23 | 0.06 |
| ATTRIBUTE 2 | 0.38 | 0.23 | 0.55 | 0.42 | 0.77 | 0.41 | 0.37 | 0.76 | 0.34 | 0.77 | 0.09 | 0.23 |
| ATTRIBUTE 3 | 0.32 | 0.10 | 0.48 | 0.52 | 0.62 | 0.28 | 0.52 | 0.48 | 0.52 | 0.17 | 0.60 | 0.51 |
| ATTRIBUTE 4 | 0.86 | 0.05 | 0.13 | 0.55 | 0.43 | 0.34 | 0.06 | 0.28 | 0.14 | 0.16 | 0.18 | 0.77 |
| ATTRIBUTE 5 | 0.54 | 0.22 | 0.37 | 0.30 | 0.35 | 0.98 | 0.32 | 0.81 | 0.24 | 0.75 | 0.38 | 0.20 |
| ATTRIBUTE 6 | 0.64 | 0.58 | 0.18 | 0.77 | 0.87 | 0.46 | 0.73 | 0.79 | 0.78 | 0.10 | 0.21 | 0.07 |
| ATTRIBUTE 7 | 0.88 | 0.23 | 0.88 | 0.50 | 0.47 | 1.00 | 0.31 | 0.63 | 0.63 | 0.85 | 0.86 | 0.32 |

# NON-TRANSITORY COMPUTER-READABLE STORAGE MEDIUM, DATA DISTRIBUTION METHOD, AND DATA DISTRIBUTION DEVICE

CROSS-REFERENCE TO RELATED APPLICATION

This application is based upon and claims the benefit of priority of the prior Japanese Patent Application No. 2016-161977, filed on Aug. 22, 2016, the entire contents of which are incorporated herein by reference.

FIELD

The embodiments discussed herein are related to a non-transitory computer-readable storage medium, a data distribution method, and a data distribution device.

BACKGROUND

In a case of storing data in a database stored in a hard disk, a bottleneck occurs in a processing speed due to a disk input and output loading. Therefore, a distributed cache technology is used, in which the data processing is performed in a high speed by managing large amounts of data with on-memory.

As a relating technology, a technology for updating a bit among bitmap cells indicating which key value is present in an index entry stored in an additional block of the database, is proposed (for example, Japanese Laid-open Patent Publication No. 05-012085). In addition, as a relating technology, a technology for generating segments in which data with similar key feature values are in the same group, is proposed (for example, Japanese Laid-open Patent Publication No. 2013-156960). A technology is proposed, which presents attributes presumed to be able to efficiently reduce the number of candidates to a data retriever (for example, Japanese Laid-open Patent Publication No. 07-085069).

SUMMARY

According to an aspect of the invention, a non-transitory computer-readable storage medium storing a data distribution program that causes a computer to execute a process, the process including calculating a first value relating to a data amount of a specified information processing device included in a plurality of information processing devices, each of a plurality of pieces of data being stored in any of the plurality of information processing devices, when the first value exceeds a reference, calculating each of a plurality of data amounts of a plurality of data groups for each of a plurality of classification conditions, each of the plurality of classification conditions indicating a characteristic used for a classification of the plurality of pieces of data into the plurality of data groups, selecting a specified classification condition from the plurality of classification conditions based on the plurality of data amounts, and distributing, to another information processing device included in the plurality of information processing devices, any of the plurality of data groups classified based on the specified classification condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a configuration example of data stored in each server;

FIG. 15 is a table illustrating a uniformity ratio in each month in a case where data is divided for each attribute.

DESCRIPTION OF EMBODIMENTS

When using a distributed caching technology, it is preferable to further improve a data access speed in an information processing device (a cache server) in which the cache data is stored. In the distributed caching technology, in order to manage a large data amount, the data is distributed and managed in a plurality of information processing devices. At this time, if the data amount in each information processing device is disproportionate, the processing load in data retrieving is also disproportionate.

As one aspect, the disclosure has an object of suppressing the disproportion of the processing loads between the plurality of information processing devices.

An Example of Overall Configuration of the System in the Embodiments

Figure 1:
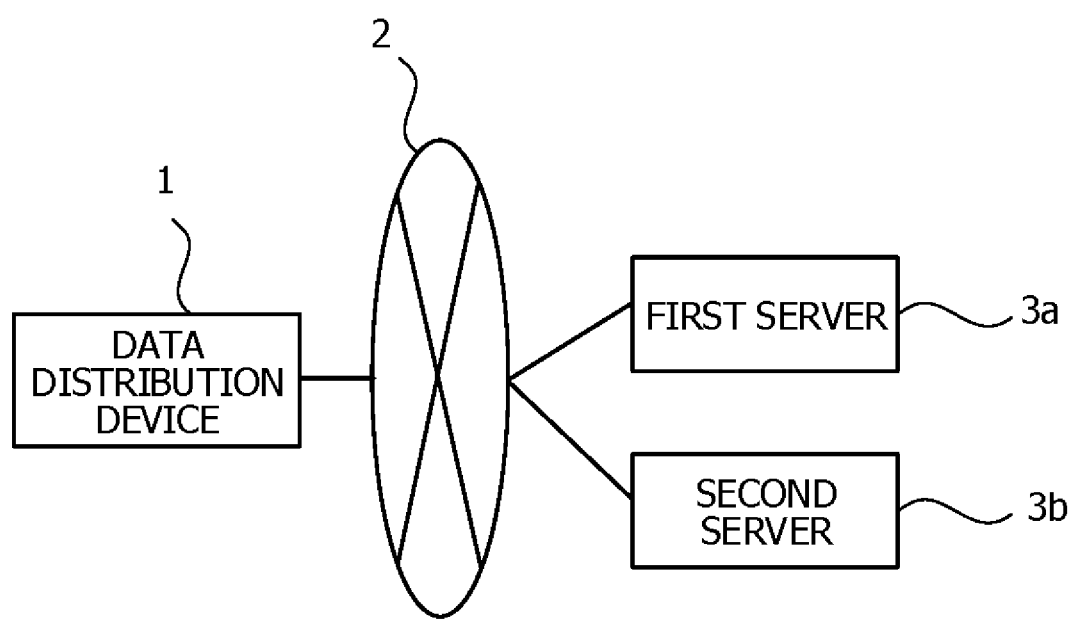
FIG. 1 is a diagram illustrating an example of an overall configuration of a system in an embodiment.

Hereinafter, embodiments will be described with reference to the drawings. FIG. 1 is a diagram illustrating an example of an overall configuration of a system in an embodiment.

The system in the embodiment includes a data distribution device 1, a network 2, a first server 3a, and a second server 3b. Hereinafter, in some cases, the first server 3a and the second server 3b are collectively referred to as a server 3. The number of servers 3 may be equal to or greater than three.

The server 3 stores at least a part of a plurality of divided data items. The server 3 is a cache server used in the distributed caching technology and stores the plurality of divided data items in a memory (main storage device). The server 3 is an example of the information processing device.

In some cases in the description in the embodiment, a data group which is a set of a plurality of data items may be expressed simply as data.

The data stored in the server 3 is data, for example, used for a specific service and having the same attributes, and is data for a user to retrieve. The specific service is, for example, is a service that is used by a plurality of customers such as in an electronic commerce.

The data distribution device 1 sends an instruction relating to the distribution of the data to the server 3 via the network 2. The data distribution device 1 sends, for example, an instruction to the first server 3a to distribute a part of the data stored in the first server 3a to the second server 3b.

The network 2 is a network connected to the data distribution device 1 and the respective servers 3. The network 2 is, for example, an intranet used in a company. The network 2 may be the Internet or the like.

An Example of the Data Distribution Device

Figure 2:
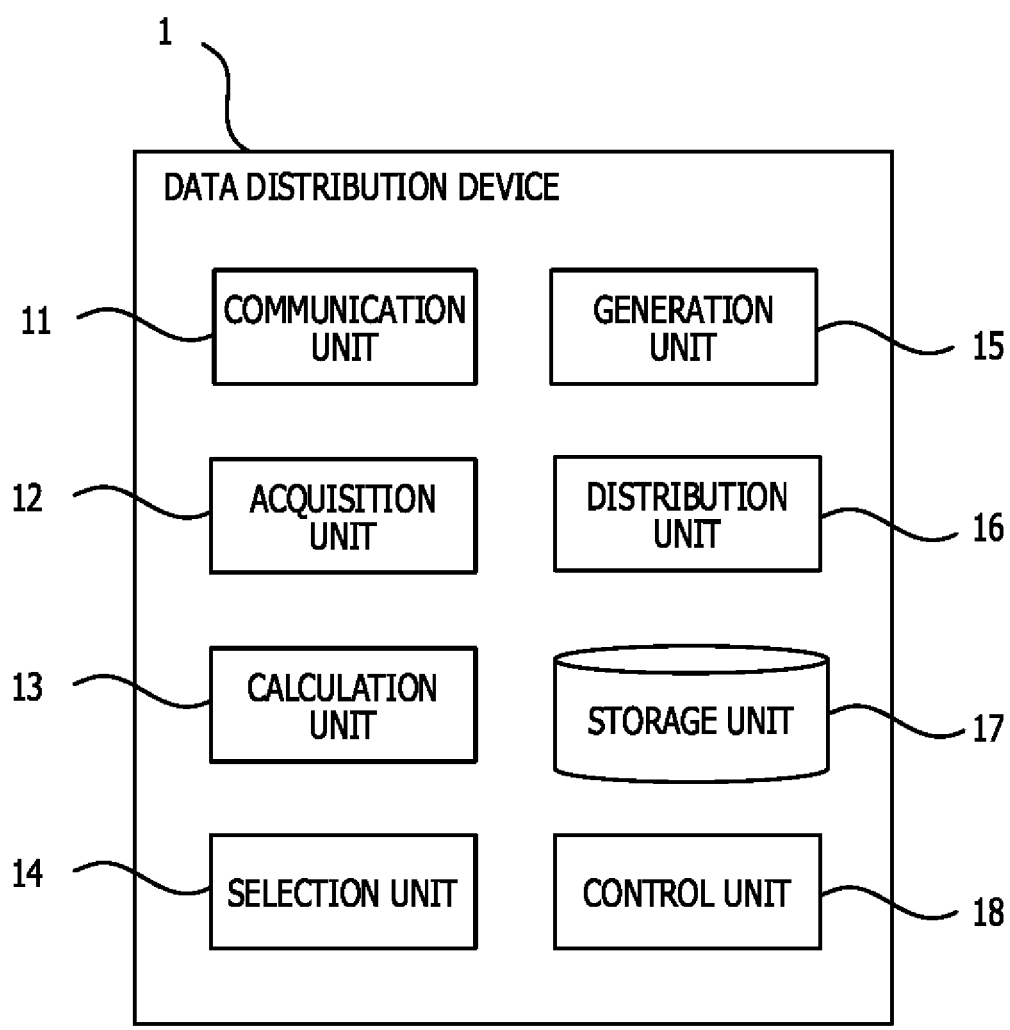
FIG. 2 is a diagram illustrating an example of a data distribution device.

FIG. 2 is a diagram illustrating an example of the data distribution device. The data distribution device 1 includes a communication unit 11, an acquisition unit 12, a calculation unit 13, a selection unit 14, a generation unit 15, a distribution unit 16, a storage unit 17, and a control unit 18.

The communication unit 11 performs communications with the server 3 via the network 2. The acquisition unit 12 acquires a data amount in the server 3 or an allowable storage amount (free capacity) via the communication unit 11. For example, in a case where a value relating to the data amount stored in any of the servers 3 exceeds a reference (reference value), the acquisition unit 12 acquires an allowable storage amount of another server 3.

In a case where a value relating to the data amount stored in any of the servers 3 among the plurality of servers 3 exceeds the reference, the calculation unit 13 calculates the data amount for each attribute when the plurality of data items stored in any server 3 are divided under respective conditions (attributes).

In a case where the data amount for each attribute when the data items are divided by the plurality of attributes differs from each other depending on a time, the calculation unit 13 may select past result information acquired for performing the calculation based on the time of performing the distribution.

The selection unit 14 selects any of the attributes among the plurality of attributes based on the data amount calculated by the calculation unit 13. The selection unit 14 may select any of the conditions among the plurality of attributes based on the data amount calculated by the calculation unit 13 and the allowable storage amount of the other server 3 acquired by the acquisition unit 12.

The selection unit 14 may select a condition in which a uniformity ratio indicating a degree of uniformity of the data amounts of the plurality of data groups after division is equal to or greater than a predetermined uniformity reference among the plurality of attributes. The selection unit 14 may select the attribute based on a value relating to a ratio of the data amount of any server 3 to the data amount of the server 3 in which the data amount is less than a predetermined threshold value.

In a case where a predetermined proportion of the data is distributed from any server 3 to the other server 3, the selection unit 14 may select a condition in which a difference between the data amount stored in any servers 3 and the data amount stored in the other server 3 becomes equal to or less than a predetermined difference reference.

The generation unit 15 generates a plurality of data groups by dividing a plurality of data items using one of the attributes selected by the selection unit 14.

The distribution unit 16 distributes any of the plurality of data groups generated by the generation unit 15 to the other server 3. The other server 3 may be a newly used server 3, or may be a server 3 that is in operation and that has already stored the data therein.

The storage unit 17 stores the uniformity ratio of the time when the retrieving target data was divided past using each of the attributes. The uniformity ratio is a ratio of one of the data after division to the other of the data after division. For example, in a case where it is assumed that the smaller data amount after division is d1 and the larger data amount after division is d2, the uniformity ratio is expressed as d1/d2. The control unit 18 performs various controls for the data distribution processing 1.

FIG. 3 is a diagram illustrating a configuration example of data stored in each server 3. One data stored in each server 3 includes a key and a value associated with the key.

The key is, for example, a sequence number. In addition, in the example in FIG. 3, the value is an object, and includes a plurality of attributes and values (attribute values) corresponding to the attributes.

The object represents, for example, "customer". In this case, the attributes are, for example, "individual or group", "age", and "gender".

In a case where the attribute is the "individual or group", the attribute value is "individual" or "group". In a case where the attribute is the "age", the attribute value may be a numerical value indicating a specific age such as "30 years old" or "50 years old", or may be information indicating a range of ages such as "20's", "under 50 years old", or "50 years old or over". In a case where the attribute is the "gender", the attribute value is "male" or "female".

The configuration of the data stored in the server 3 is not limited to the data configuration in FIG. 3, but the data may be configured in any way as long as one data includes a plurality of attributes. The configuration of the data stored in the server 3 may be a Java script object notation (JSON) or a YAML ain't a markup language (YAML).

In a case where a plurality of data items are distributed and stored in the plurality of servers 3, how to distribute each data is determined. In a case where the data items are distributed such that the data amount in each server 3 is uniform, for example, the distribution using the key can be considered. However, in many cases, since the key is a numerical value having no meaning like the sequence number, and in a case of distribution using the key, the data is randomly distributed. In this case, in order to retrieve specific data, it is difficult to retrieve the data at a high speed because all the servers 3 are retrieved.

Therefore, in order to retrieve the data in the server 3 at a high speed, it is preferable that the data be distributed using the attributes. For example, it is assumed that the data of which the attribute is "individual or group" and the attribute value is "individual" is stored in the first server 3a, and the data of which the attribute is "individual or group" and the attribute value is "group" is stored in the second server 3b. In this case, if data of "individual" and "50 years old or over" is acquired, only the data in the first server 3a is retrieved and the data in the second server 3b is excluded from the retrieving target. Therefore, a high-speed retrieving processing can be realized.

However, in a case of distributing the data using the attributes, the data amounts in each of the servers 3 are not uniform, and a large disproportion may occur. In a case where the system in the embodiment is used in the service for many individual customers, when the distribution using the attribute of "individual or group" is performed, the data amount in the first server 3a is more than that in the second server 3b. In this case, it takes time for the retrieving processing on the first server 3a. Accordingly, it is preferable that the attributes used for the data distribution be selected such that the difference in data amount stored in each server 3 is suppressed.

An Example of a Processing Flow in the Embodiment

Figure 4:
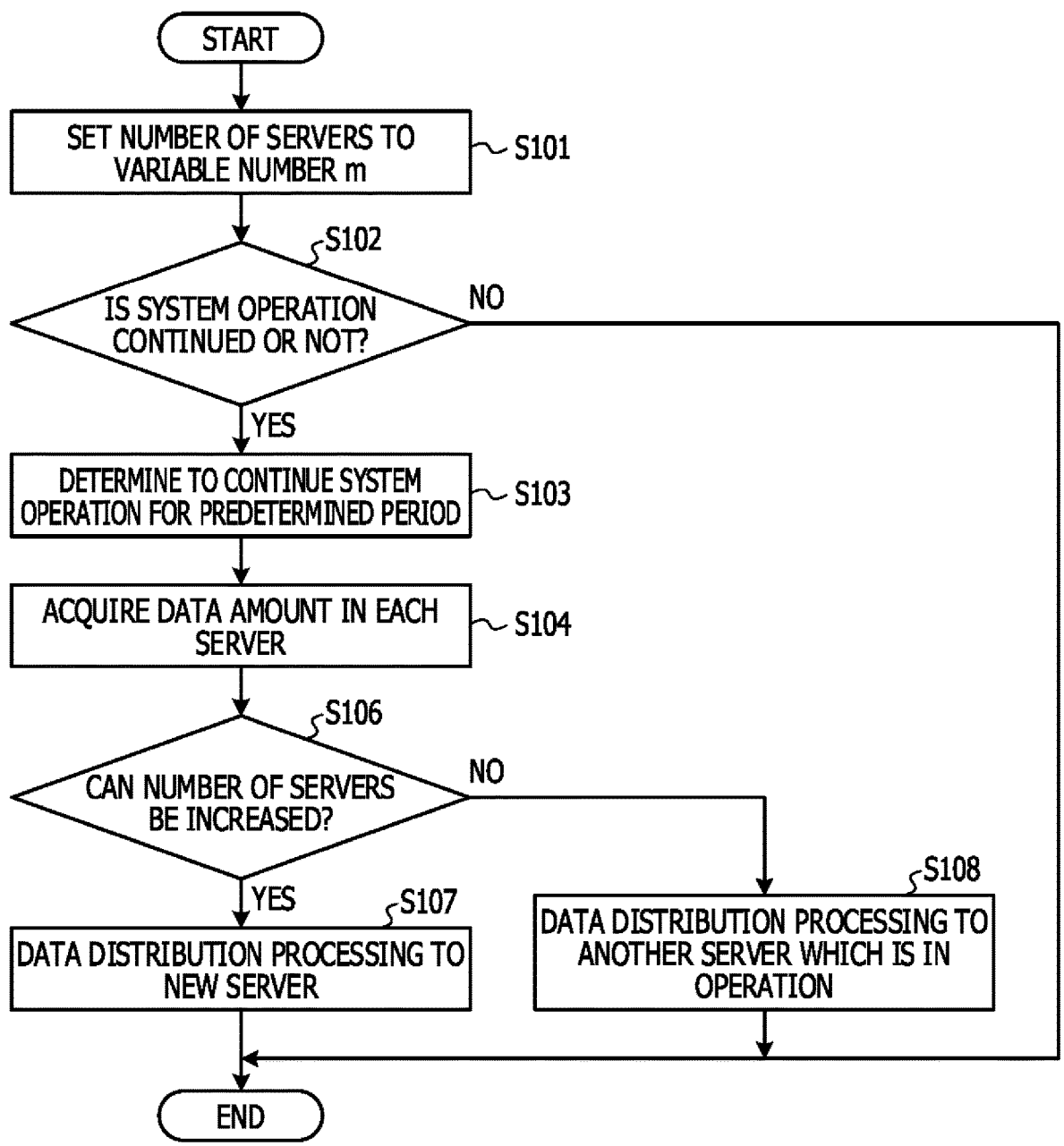
FIG. 4 is a flowchart illustrating an example of a processing flow in a first embodiment.

FIG. 4 is a flowchart illustrating an example of a processing flow in the first embodiment. The processing described in FIG. 4 is performed, for example, for every predetermined time.

The control unit 18 sets the number of servers 3 to a variable number m (m is an integer equal to or greater than two) (STEP S101). The number of servers 3 in STEP S101 is the number of servers that is in operation and that has already stored the retrieving target data therein.

The control unit 18 determines whether or not to continue the system operation (STEP S102). In STEP S102, the control unit 18 determines whether or not to continue the system operation based on, for example, an operation period set in advance by the administrator. In a case of not continuing the system operation (NO in STEP S102), the control unit 18 ends the processing. In a case of continuing the system operation (YES in STEP S102), the control unit 18 determines to continue the system operation for a predetermined period (STEP S103). In this case, the control unit 18 notifies the server 3 of continuing the system operation via the communication unit 11.

The acquisition unit 12 acquires the data amount in each server 3 (STEP S104). The acquisition unit 12, for example, inquires the server 3 via the communication unit 11 to acquire the data amount in the cache memory. The data amount acquired in STEP S104 is assumed to be only the data amount of the retrieving target data.

The control unit 18 determines whether or not the number of servers can be increased (STEP S106). The number of servers means the number of servers in which the retrieving target data is stored. Whether or not the number of servers can be increased is set by, for example, the administrator in advance, and the control unit 18 determines whether or not the number of servers can be increased by checking the set content.

In a case where the number of servers can be increased (YES in STEP S106), the process proceeds to the data distribution processing to a new server (STEP S107). In a case where the number of servers is not able to be increased (NO in STEP S106), the process proceeds to the data distribution processing to another server which is in operation (STEP S108).

Figure 5:
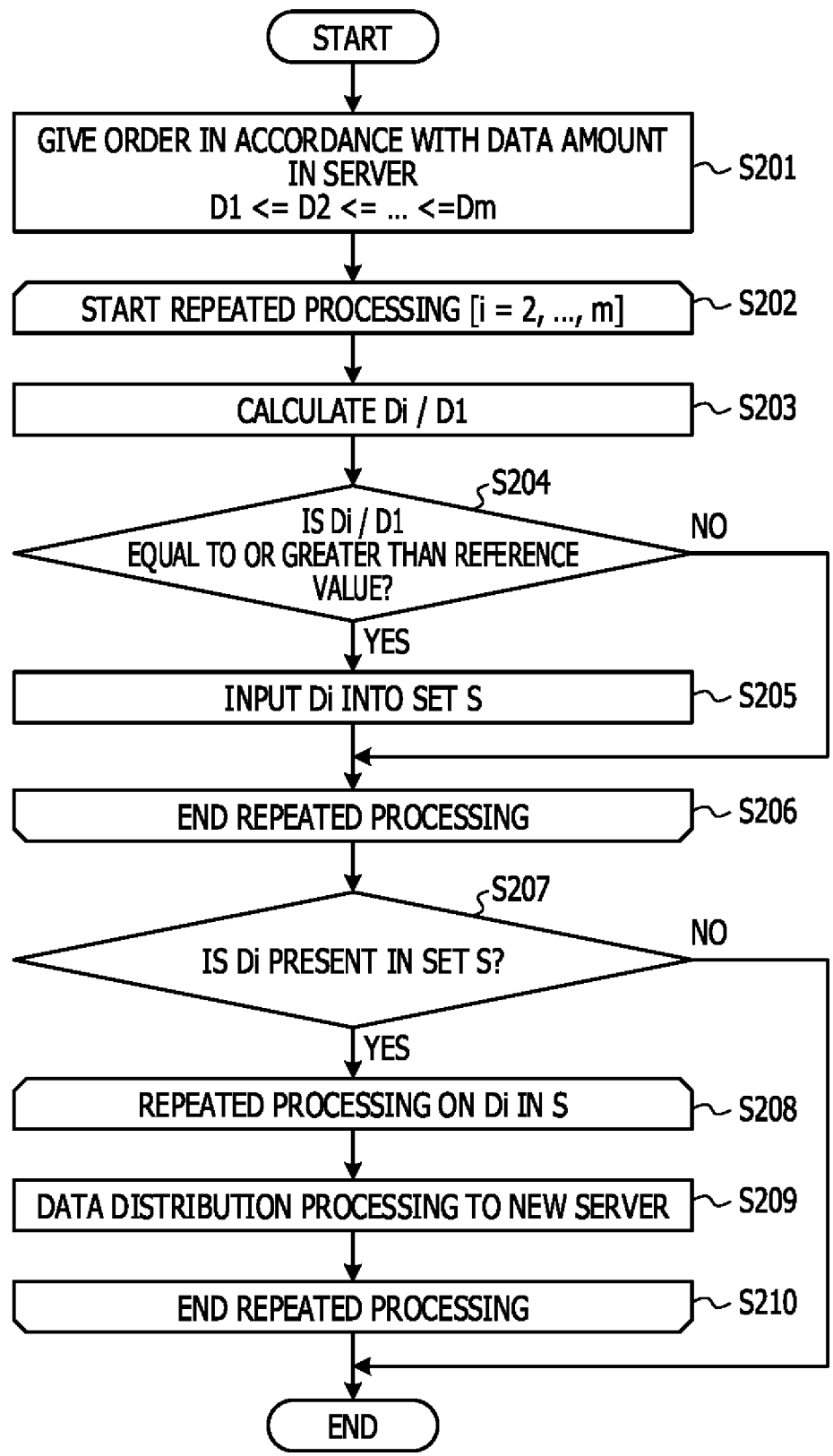
FIG. 5 is a flowchart illustrating an example of detailed processing in STEP S107 in FIG. 4.

FIG. 5 is a flowchart illustrating an example of detailed processing in STEP S107 in FIG. 4. The processing illustrated in FIG. 5 is an example of detailed content of the data distribution processing to the new server in STEP S107 in FIG. 4.

The calculation unit 13 gives order to the data amount in each server 3 acquired in STEP S104 in accordance with the sizes of the data amount (STEP S201). Hereinafter, each data group (and the data amount of each data group) in each server 3 is expressed as D1, D2, . . . , Dm, and then, it is assumed that D1≤D2≤ . . . Dm is established for each data amount.

The calculation unit 13 starts the repeated processing for each data group Di in each server 3 (i=2, 3, . . . , m) (STEP S202). The calculation unit 13 calculates a value Di/D1 (STEP S203). The calculation unit 13 determines whether or not the value Di/D1 is equal to or greater than a reference value set in advance (STEP S204). In a case where the value Di/D1 is equal to or greater than the reference value (YES in STEP S204), the calculation unit 13 inputs the Di into a set S.

In STEP S204, the data amount of another data of which the data amount is smaller than the predetermined threshold value may be used instead of D1. In addition, in STEP S204, it may be determined whether or not the data amount of Di is equal to or greater than an upper limit threshold value.

In a case where the processing items in STEPs S203 to S205 are finished for the entire of Di (i=2 to m), the calculation unit 13 ends the repeated processing (STEP S206). Due to the processing items in STEPs S202 to S207, the set S becomes a set that includes all the Di of which the value Di/D1 exceeds the reference value.

The calculation unit 13 determines whether or not the Di is present in the set S (STEP S207). A case of YES in STEP S207 means that one or more Di that make YES in the processing STEP S204 are present. In a case where the Di is not present in the set S (NO in STEP S207), the control unit 18 ends the processing. The case where the Di is not present in the set S means that the Di that makes YES in the processing STEP S204 is not present. That case means that the data amounts in all the servers 3 are made uniform to a level equal to or higher than a predetermined level.

In a case where the Di is present in the set S (YES in STEP S207), the control unit 18 starts the repeated processing on the Di in the set S (STEP S208). The data distribution device 1 performs the processing for distributing the Di into the new server (STEP S209). The new server is a server 3 newly used for storing a plurality of retrieving target data items. In a case where the processing in STEP S209 for all the Di in the set S is finished, the control unit 18 ends the repeated processing (STEP S210).

The data distribution device 1 may return the process to STEP S201 after the processing in STEP S210. Thereafter, the data distribution device 1 may repeat the processing items in STEPs S201 to S210 until the determination in STEP S207 becomes NO. That is because, in a case where the determination in STEP S207 becomes NO, it means that the data items in all the servers 3 are made uniform to the level equal to or higher than the predetermined level.

Figure 6:
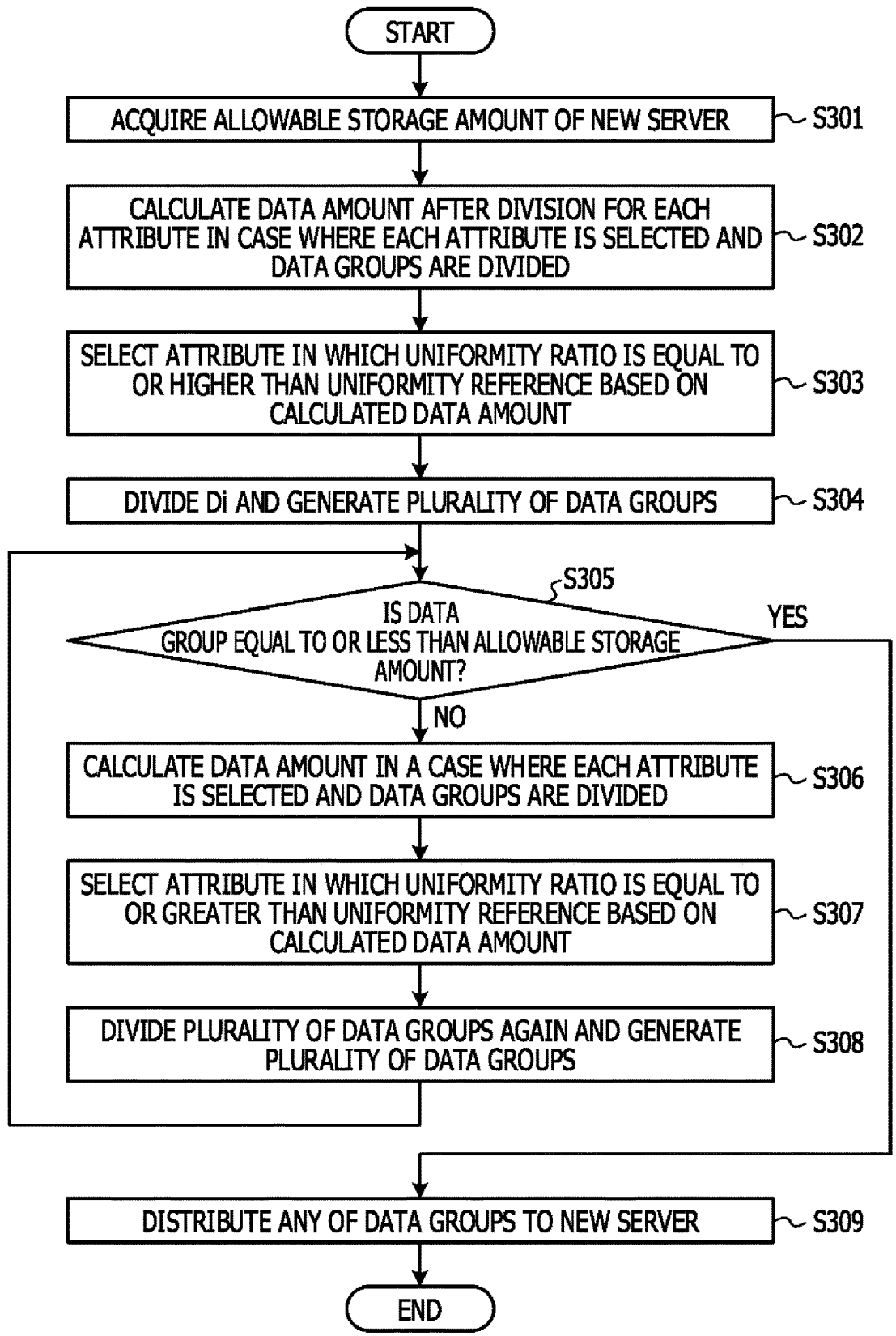
FIG. 6 is a flowchart illustrating a first example of detailed processing in STEP S209 in FIG. 5.

FIG. 6 is a flowchart illustrating a first example of the detailed processing in STEP S209 in FIG. 5. The acquisition unit 12 acquires an allowable storage amount of the new server which is a data distribution destination (STEP S301). The allowable storage amount is, for example, a current free capacity of the cache memory of the new server.

The calculation unit 13 calculates the data amount after division for each attribute in a case where each attribute is selected and the data groups (Di) are divided (STEP S302). The calculation unit 13 calculates each data amount after division based on, for example, the past result of data division in a case where a plurality of data items are divided for each attribute.

For example, it is assumed that the attributes and the uniformity ratio in a case where the data is divided for each attribute are stored in association with each other based on the past result of data division. In a case where it is assumed that the smaller data amount after division is d1 and the larger data amount after division is d2, the uniformity ratio is expressed as d1/d2.

The selection unit 14 selects the attribute in which the uniformity ratio of the plurality of data groups after division is equal to or higher than the uniformity reference set in advance among the plurality of attributes based on the calculated data amount (STEP S303).

In addition, in STEP S303, the selection unit 14 selects an attribute which is not used for dividing the division target data yet. For example, even if the data divided already using the attribute "gender" is divided again using the attribute "gender", the data amount is not changed.

The generation unit 15 divides the Di using the selected attribute and generates a plurality of data groups (STEP S304).

For example, in a case where the attribute selected in STEP S303 is the "gender", the generation unit 15 generates a plurality of data groups by dividing the Di into the data group of which the "gender" is "male" and the data group of which the "gender" is "female" in STEP S304.

The control unit 18 determines whether or not the data amount of one data group after division is equal to or less than the allowable storage amount of the new server (STEP S305). For example, the control unit 18 performs the processing in STEP S305 on the data group of which the data amount is small as a target under the assumption of leaving the data group of which the data amount is large among the plurality of data groups after division in the server 3 in which that large data are currently stored.

In a case where the data amount of the target data group is not equal to or less than the allowable storage amount of the new server (NO in STEP S305), the calculation unit 13 calculates the data amount of the data group for each attribute after division in a case where the each attribute is selected and the plurality of data groups generated in STEP S304 are divided (STEP S306). The selection unit 14 selects the attribute in which the uniformity ratio of the plurality of data groups after division is equal to or greater than the uniformity reference among the plurality of data groups based on the calculated data amount (STEP S307). In STEP S307, the selection unit 14 selects the attribute which is not used for dividing the target data yet. The generation unit 15 divides each of the plurality of data groups again using the selected attribute, and generates a plurality of data groups (STEP S308).

The processing items in STEPs S306 to S308 are similar to the processing items in STEPs S302 to S304. However, the processing targets in STEPs S302 to S304 are Di while the processing targets in STEPs S306 to S308 are the plurality of data groups after division of the Di.

The control unit 18 determines whether or not the data amount of the data groups currently stored in the server 3, except one data group to be left in the server 3, among the data groups divided in STEP S308 is equal to or less than the allowable storage amount of the new server (STEP S305). The control unit 18 assumes that, for example, the data group of which the data amount is the largest among the data groups divided in STEP S308 is left in the server 3 where that data group is currently stored. In a case where the data amount is not equal to or less than the allowable storage amount of the new server, the process returns to the processing in STEP S306 again.

In a case where the data amount is equal to or less than the allowable storage amount of the new server, the distribution unit 16 distributes any of the data groups after division to the new server (STEP S309). The distribution unit 16 leaves the largest data group among the plurality of data groups in the storing server 3 where that largest data group is currently stored, and distributes the other data groups to the new server. In the first example of the data distribution processing to the new server illustrated in FIG. 6, in a case where it is considered that there is a sufficient free space in the allowable storage amount of the new server for the data amount, the allowable storage amount may not be checked. In this case, STEPs S301, and S305 to S308 may be omitted.

Figure 7:
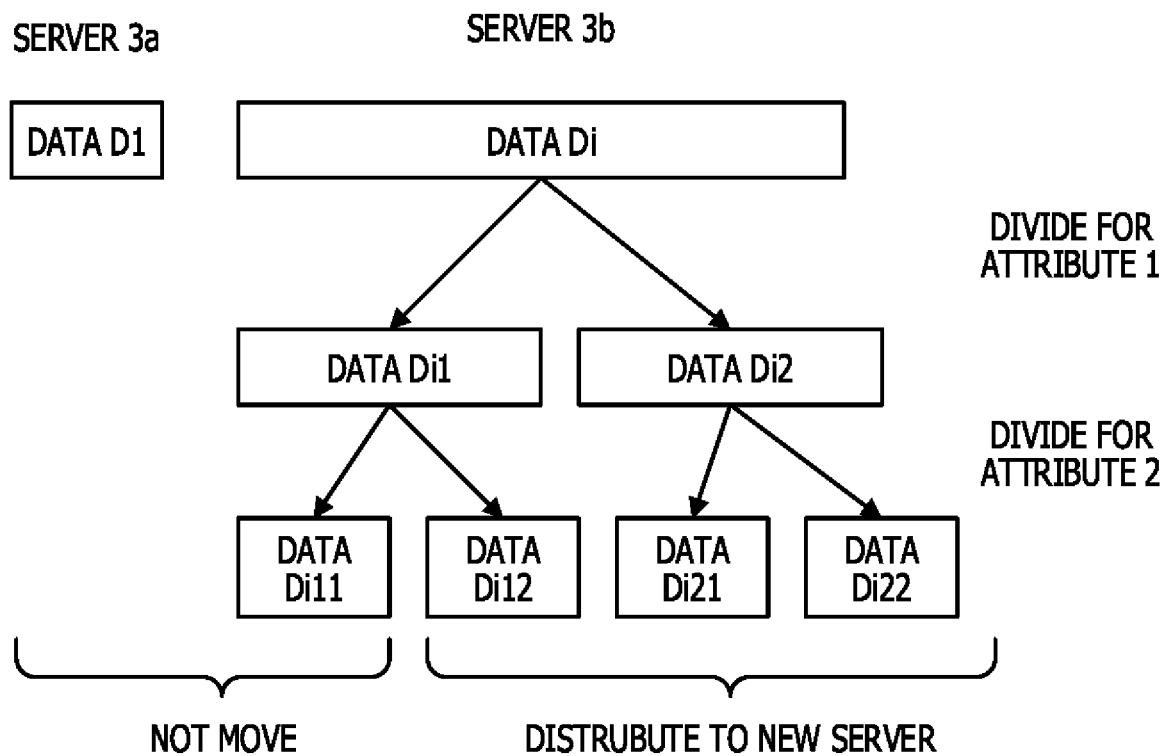
FIG. 7 is a diagram (part 1) illustrating a first example of data distribution processing to a new server.
Figure 8:
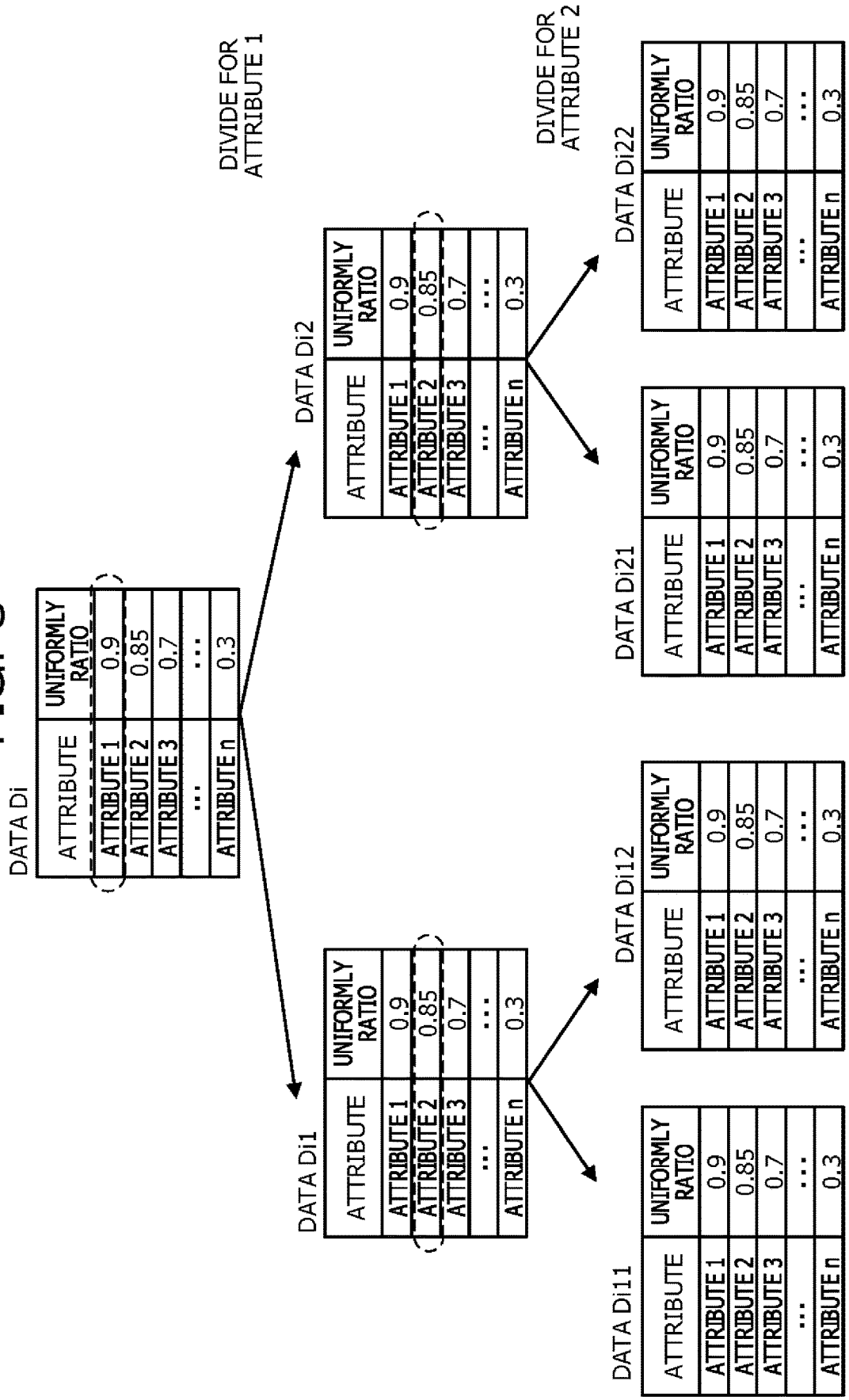
FIG. 8 is a diagram (part 2) illustrating the first example of data distribution processing to the new server.

FIG. 7 and FIG. 8 are diagrams illustrating a first example of the data distribution processing to the new server. The first example corresponds to the processing illustrated in FIGS. 5 and 6. FIG. 7 represents the distribution situation of each data in the first example. FIG. 8 illustrates the attribute of each data and the uniformity ratio associated with the attribute in the first example. Parts surrounded by dotted lines indicate the selected attributes.

As illustrated in FIG. 7, the data group D1 is stored in the server 3a and the data group Di is stored in the server 3b. In this case, it is assumed that determination is made in STEP S204 that the value Di/D1 exceeds the reference value and the Di is divided, and then, the divided data group is distributed to the new server.

It is assumed that the selection unit 14 selects an attribute 1 as the attribute to divide the Di in the processing in STEP S303. The generation unit 15 divides the Di using the attribute 1 and generates a plurality of data groups Di1 and Di2 in the processing in STEP S304. It is assumed that any of the Di1 and Di2 exceeds the allowable storage amount of the new server and that it is determined to be NO in STEP S305.

Then, it is assumed that the selection unit 14 selects an attribute 2 as the attribute to divide the Di1 and Di2 in the processing in STEP S307. The generation unit 15 divides the Di1 and Di2 using the attribute 2 and generates a plurality of data groups Di11, Di12, Di21, and Di22 in the processing in STEP S308.

The distribution unit 16 respectively distributes the data group Di12, Di21, and Di22 to the new server in STEP S309. In this case, the D1 and Di11 are not moved and are left in the currently storing server 3a and the server 3b respectively.

The first example is described to be realized by performing the processing items in STEPs S306 to S308. Even in a case where the processing items in STEPs S306 to S308 are not performed, there is a possibility that the dividing processing is performed two times by performing the processing items in STEPs S201 to S210 twice as in the first example.

As described above, in a case where there is a disproportion of the data amount among a plurality of servers, the data distribution device 1 divides the data in the server 3 of which the data amount is large. In this way, since it is possible to suppress the disproportion of the data amount, and thus, it is possible to suppress the disproportion of processing load at the time of data retrieving.

In addition, in a case where the data amount to be distributed exceeds the allowable storage amount after checking the allowable storage amount of the new server which is the data distribution destination, the data dividing is performed again. Therefore, it is possible to avoid the data amount to be distributed from exceeding the allowable storage amount of the new server which is the data distribution destination.

Figure 9:
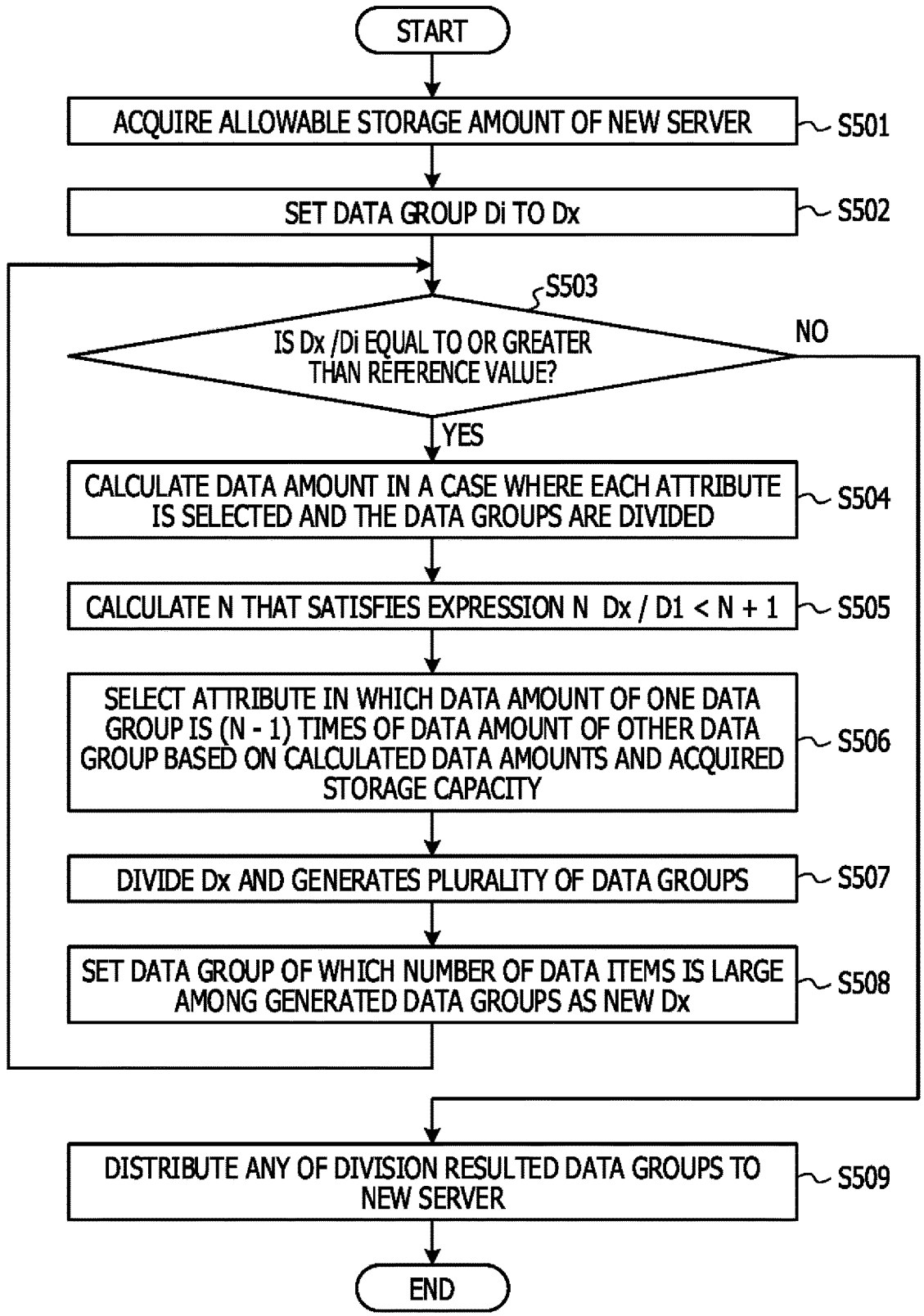
FIG. 9 is a flowchart illustrating a second example of detailed processing in STEP S209 in FIG. 5.

FIG. 9 is a flowchart illustrating a second example of detailed processing in STEP S209 in FIG. 5. The acquisition unit 12 acquires the allowable storage amount of the new server which is the data distribution destination (STEP S501). The allowable storage amount is, for example, a current free capacity of the cache memory of the new server.

The control unit 18 sets the data group Di to Dx (STEP S502). The control unit 18 determines whether or not the value Dx/D1 is equal to or greater than the reference value (STEP S503). The reference value used in STEP S503 may be, for example, the same as the reference value used in STEP S204.

The data amount of another data of which the data amount is smaller than the predetermined threshold value may be used instead of D1 in STEP S504. In addition, it may be determined whether or not the data amount of Dx is equal to or larger than an upper limit threshold value in STEP S504.

In a case where Dx/D1 is equal to or greater than the reference value (YES in STEP S503), the calculation unit 13 calculates each data amount after division for each attribute in a case where each attribute is selected and the data groups Dx are divided (STEP S504). The calculation unit 13 calculates the data amount after division based on, for example, the past result in a case where a plurality of data items are divided for each attribute. Then, the calculation unit 13 calculates an N that satisfies an expression N≤Dx/D1<N+1 (STEP S505).

A data amount stored in another server 3 in which the data amount is smaller than the predetermined threshold value may be used instead of D1 in STEP S505.

The selection unit 14 selects the attribute in which the data amount of one data group is (N−1) times of the data amount of the other data group when the data items are divided, based on the data amounts calculated in STEP S504 and the storage capacity acquired in STEP S501 (STEP S506). The selection unit 14 may select the attribute in which the number of data items in one data group is closest to (N−1) times of the number of data items in the other data group when the data items are divided. By the processing in STEP S506, the data amount of the smaller data after division becomes the data amount close to D1.

In STEP S506, the selection unit 14 selects the attribute such that, for example, the data amount of the data group (for example, the data group of which the data amount is larger) to be distributed to the new server among the data items after division becomes smaller than the total storage capacity of the new server.

The generation unit 15 divides the Dx using the selected attribute and generates a plurality of data groups (STEP S507). The generation unit 15 sets the data group of which the number of data items is large among the generated data groups as a new Dx (STEP S508).

The control unit 18 determines again whether or not the value Dx/Di exceeds the reference value (STEP S503). In a case of NO in STEP S503, the distribution unit 16 distributes any of the data groups which are the result of dividing Di to the new server (STEP S509).

In the second example of data distribution processing to the new server illustrated in FIG. 9, in a case where it is considered that there is a sufficient free space in the allowable storage amount of the new server for the data amount, the allowable storage amount may not be checked. In this case, in STEP S506, the selection unit 14 may select any attribute as long as the data amount of one data group becomes (N−1) times of the data amount of the other data group without considering the allowable storage amount.

Figure 10:
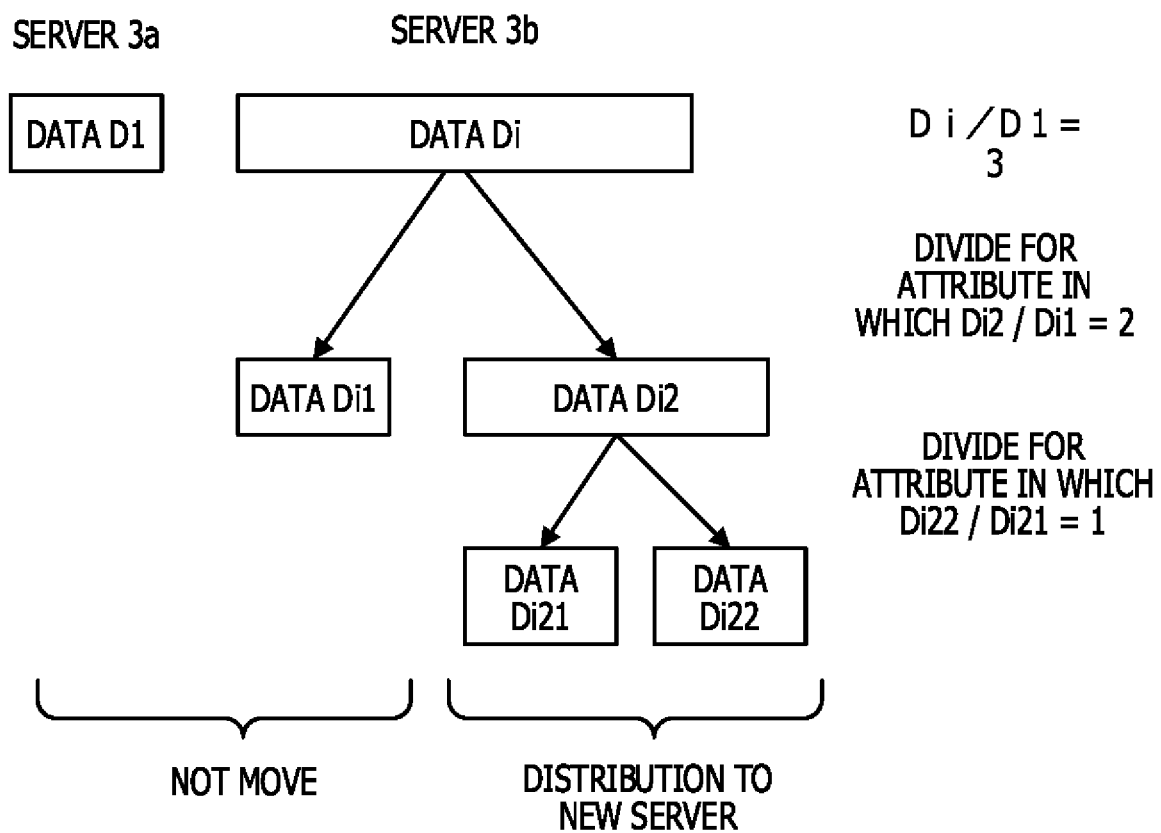
FIG. 10 is a diagram illustrating a second example of data distribution processing to a new server.

FIG. 10 is a diagram illustrating a second example of the data distribution processing to the new server. The second example illustrated in FIG. 10 corresponds to the second example of the data distribution processing to the new server illustrated in FIG. 9.

In the second example illustrated in FIG. 10, the data group D1 is stored in the server 3a and the data group Di is stored in the server 3b. In addition, the data amount ratio is assumed to be Di/D1=3 and the reference value in STEP S503 is assumed to be 2. In this case, in the processing in STEP S503, it is determined that Dx/D1 is equal to or greater than the reference value.

In the processing in STEP S505, N is calculated as N=3 since Dx/D1=3. In STEP S506, the selection unit 14 selects the attribute in which the data amount of one data group is two times ((N−1) times) of the data amount of the other data group in order to divide the Di. Then, the data group Di is divided into the data groups Di1 and Di2 (Di2/Di1=2).

Thereafter, in STEP S508, Di2 is set to Dx and the determination in STEP S503 is performed again. In this example, since Dx/D1=2 which is equal to or greater than the reference value (=2), and thus, the division is performed again.

In this case, in the processing in STEP S505, N is calculated as N=2 since Dx/D1=2. Accordingly, In STEP S506, the selection unit 14 selects the attribute in which the data amount of one data group is one times ((N−1) times) of the data amount of the other data group in order to divide the Di. Then, the data group Di2 is divided into the data groups Di21 and Di22 (Di22/Di21=1).

As a result of the processing described above, the data Di in the server 3b is divided into three data groups such as the data Di1, the data Di21, and the data Di22. In this example, the distribution unit 16 distributes the data Di21 and the data Di22 to the new server respectively. In this way, it is possible to make the data amounts of the data D1 stored in the server 3a, the data Di1 stored in the server 3b, and the data Di21 and data Di22 stored in the new server uniform.

As a result of the processing described above, in a case where there is a disproportion between a plurality of servers, the data is divided such that the data amounts of the plurality of data groups after division are close to D1. In this way, it is possible to suppress the disproportion of the processing loads among the plurality of servers 3.

In addition, since the attribute is selected such that the data amount to be distributed does not exceed the allowable storage amount after checking the allowable storage amount of the new server which is the data distribution destination, it is possible to suppress the data amount to be distributed from exceeding the allowable storage amount of the new server which is the data distribution destination.

Figure 11:
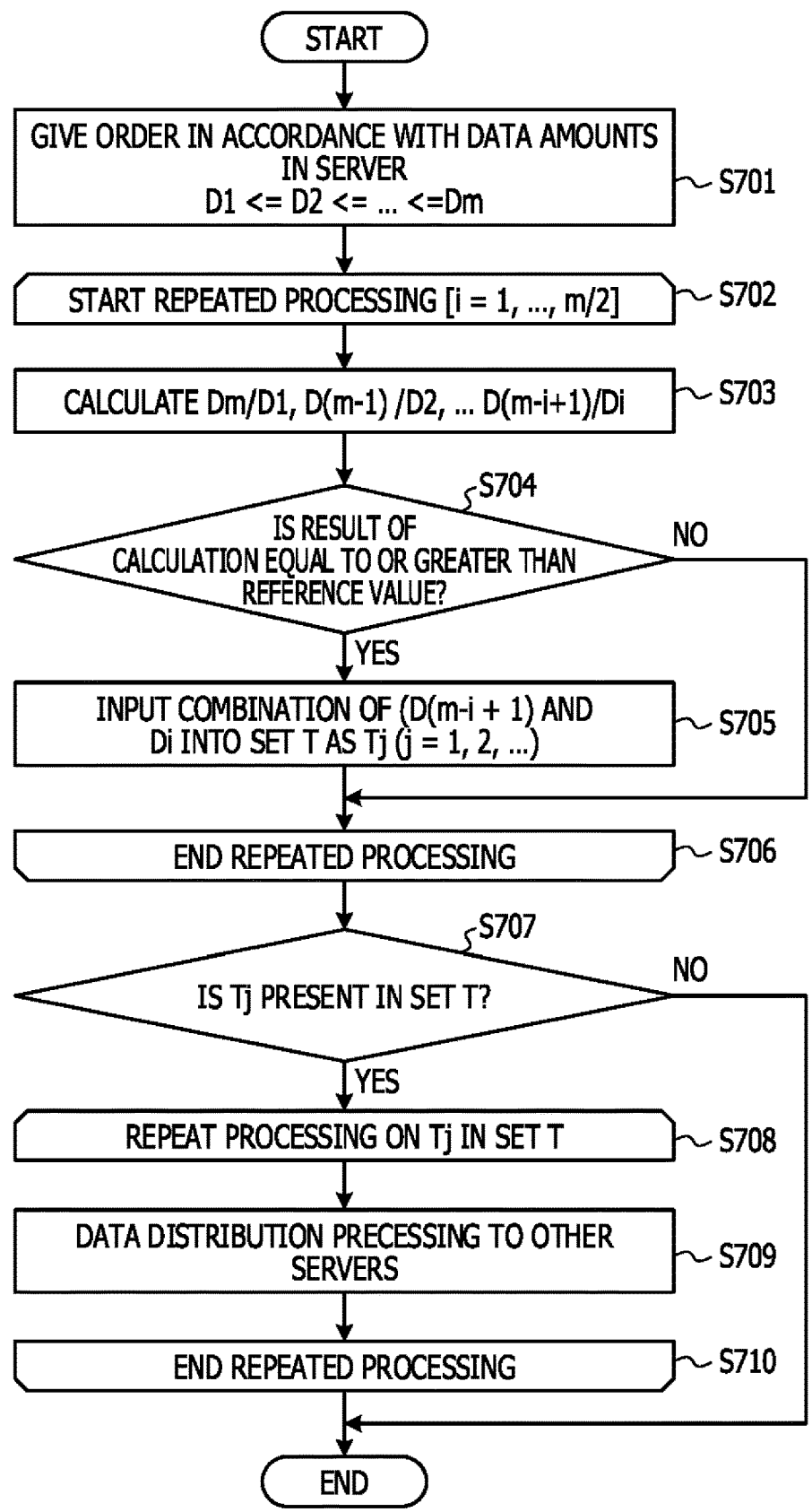
FIG. 11 is a flowchart illustrating an example of detailed processing in STEP S108 in FIG. 4.

FIG. 11 is a flowchart illustrating an example of detailed processing in STEP S108 in FIG. 4. The calculation unit 13 gives order to the data amounts in each of the servers 3 acquired in STEP S104 in accordance with the sizes of the data amounts (STEP S701). Hereinafter, it is assumed that the data groups in each of the servers 3 (and the data amounts of each data group) are expressed as D1, D2, ..., Dm, and an expression D1≤D2≤ ... ≤Dm is established for each data amount.

The calculation unit 13 starts repeated processing on the data Di in each server 3 (i=1, 2, ..., m/2) (STEP S702). The calculation unit 13 calculates Dm/D1, D(m−1)/D2, ..., D(m−i+1)/Di respectively (STEP S703). The calculation unit 13 determines whether or not the value of (D(m−i+1)/Di) which is a result of calculation in STEP S703 is equal to or greater than the reference value set in advance (STEP S704). In a case of being greater than the reference value (YES in STEP S704), the calculation unit 13 inputs a combination of two data groups (D(m−i+1) and Di) used in calculation into a set T as Tj (j=1, 2, ...).

The reference value used in STEP S704 may be the same as the reference value used in STEP S204, or may be different from that.

In a case where the processing items in STEPs S703 to S705 are finished for all the Di (i=1 to m/2), the calculation unit 13 ends the repeated processing (STEP S706). With the processing items in STEPs S702 to S706, the set T includes all the combinations of D(m−i+1) and Di in which D(m−i+1)/Di exceeds the reference value.

The calculation unit 13 determines whether or not Tj is present in the set T (STEP S707). In a case where the Tj is not present in the set T (NO in STEP S707), the control unit 18 ends the processing. In the case where the Tj is not present in the set T, it means that D(m−i+1)/Di that makes YES in the processing in STEP S704 is not present. That is, it means that the data in all the servers 3 are made uniform to be equal to or higher than a predetermined level.

In a case where the Tj is present in the set T (YES in STEP S707), the control unit 18 starts the repeated processing on the Tj in the set T (STEP S708). In the case of YES in STEP S707, it means that one or more D(m−i+1)/Di that make YES in the processing in STEP S704 are present. The data distribution device 1 performs the processing for distributing a part of D(m−i+1) to Di (other servers) (STEP S709). In a case where the processing in STEP S709 is finished for all the Tj in the set T, the control unit 18 ends the repeated processing (STEP S710).

Figure 12:
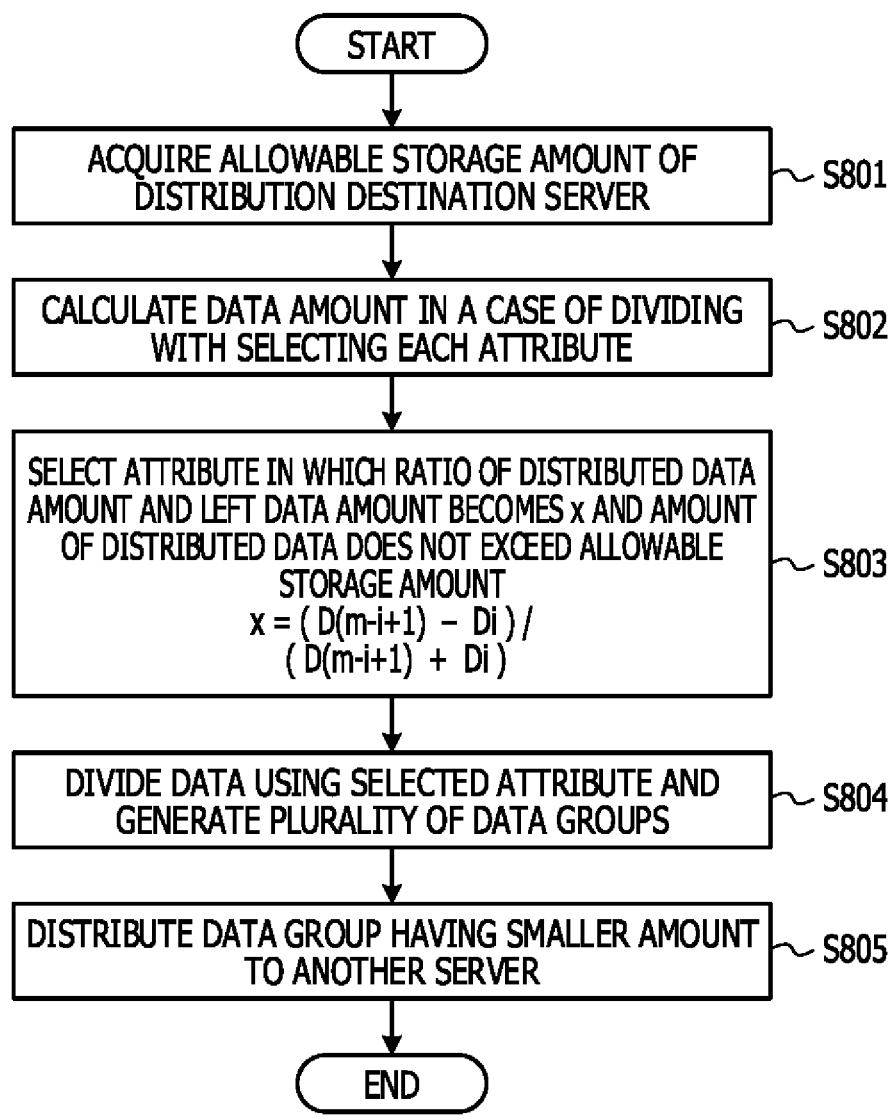
FIG. 12 is a flowchart illustrating an example of detailed processing in STEP S709 in FIG. 11.

FIG. 12 is a flowchart illustrating an example of detailed processing in STEP S709 in FIG. 11. The acquisition unit 12 acquires the allowable storage amount of a distribution destination server (the server 3 storing Di) (STEP S801). The allowable storage amount is, for example, a current free capacity of the cache memory in the server 3 storing Di.

The calculation unit 13 calculates the data amount in a case where the D(m−i+1) is divided with selecting each attribute (STEP S802). For example, the attributes and the uniformity ratio in a case where the data is divided for each attribute are stored in association with each other based on the past result of data division. The calculation unit 13 calculates the data amount in a case of dividing the D(m−i+1) for each attribute using the uniformity ratio.

The selection unit 14 selects the attribute in which a ratio of the data amount to be distributed and the data amount to be left becomes x and the amount of distributed data does not exceed the allowable storage amount, based on the calculated data amount (STEP S803). The ratio x of the data amount to be left and the data amount to be distributed is expressed as described below.

$$x=(D(m-i+1)-Di)/(D(m-i+1)+Di)$$

In a case where the attribute in which the uniformity ratio becomes x is selected and the data is divided, and then, the data having the smaller amount is distributed, the data amount in the server 3 that distributed the data (server 3 stored (D(m−i+1))) and the data amount in the server 3 to which the data was distributed (server 3 stored the Di) are made uniform.

The selection unit 14 selects, for example, an attribute in which the uniformity ratio in the past result becomes x, or an attribute in which a difference between the uniformity ratio and x is within a predetermined value. That is, in a case where a predetermined proportion of data (proportion corresponding to the numerator of x) is distributed from any server 3 to the other server 3, the selection unit 14 selects a condition in which a difference between the data amount stored in any server 3 and the data amount stored in the other server 3 is equal to or smaller than a predetermined difference reference.

In addition, as a result of selecting the attribute in which the uniformity ratio is close to x, in a case where the data amount to be distributed exceeds the allowable storage amount, the selection unit 14 selects again the attribute in which the data amount to be distributed becomes small (in which the uniformity ratio is low).

The generation unit 15 divides the D(m−i+1) using the selected attribute and generates a plurality of data groups (STEP S804). The distribution unit 16 distributes the data group having the smaller amount (corresponding to the numerator of the ratio x) among the generated plurality of data groups to another server 3 (server 3 storing Di) (STEP S805).

As described above, by distributing the data from the server 3 storing large data amount to the server storing small data amount, it is possible to suppress the disproportion of the processing loads among a plurality of servers even in situations where it is difficult to increase the number of servers.

Figure 13:
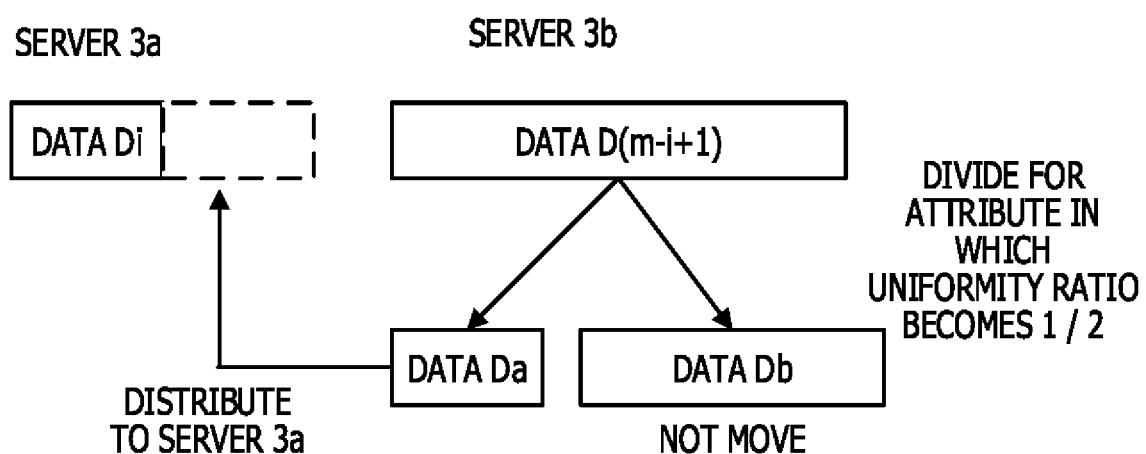
FIG. 13 is a diagram illustrating an example of data distribution processing to another server.

FIG. 13 is a diagram illustrating an example of data distribution processing to the other server. In the example illustrated in FIG. 13, it is assumed that the data group Di is stored in the server 3a and the data group D(m−i+1) is stored in the server 3b. In addition, it is assumed that D(m−i+1)/Di is 3.

In this case, when the reference value is 2, the result of determination in STEP S704 is YES. The combination of (D(m−i+1) and Di) is input to the set T, and data distribution processing in STEP S709 is performed.

In this example, since D(m−i+1)/Di is 3, the ratio x in the processing in STEP S803 is 1/2. Therefore, the selection unit 14 selects an attribute in which the uniformity ratio becomes 1/2 or an attribute in which a difference between the uniformity ratio and 1/2 is within the predetermined value. In addition, in this example, when assuming that the data is divided for the selected attribute, it is assumed that the data amount to be distributed does not exceed the allowable storage amount.

The generation unit 15 divides the D(m−i+1) using the selected attribute and generates a plurality of data groups Da and Db (Da/Db=1/2) in STEP S804. The distribution unit 16 distributes the data group Da having the smaller amount between the data groups Da and Db to the server 3a.

As a result of the processing described above, if the ratio x is the same as the uniformity ratio associated with the attribute, the distribution resulted data amount Di+Da in the server 3a becomes the same as the data amount of the data Db, and thus, the data amount in the server 3a and the data amount in the server 3b are made uniform.

Figure 14:
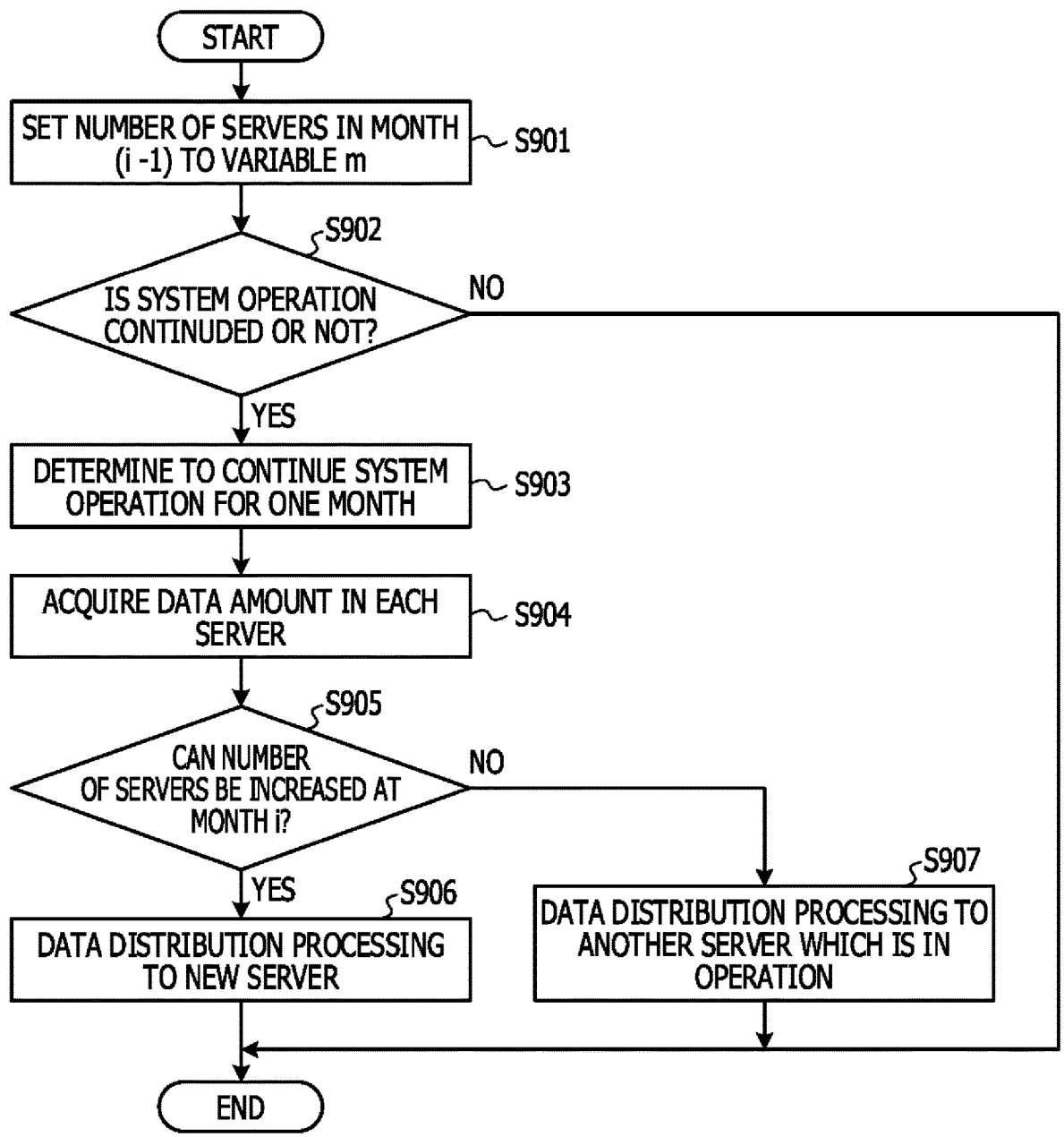
FIG. 14 is a flowchart illustrating an example of a processing flow in a second embodiment.

FIG. 14 is a flowchart illustrating an example of a processing flow in a second embodiment. In the processing in the second embodiment, it is assumed that the distribution processing is performed every month, and an example is illustrated, in which the tendency of the uniformity ratio differs in every month. In addition, it is assumed that the processing below is initially performed in the beginning of month i. FIG. 15 is a table illustrating uniformity ratios in each month in a case where data is divided for each attribute.

The control unit 18 sets the number of servers in month (i−1) to a variable m (STEP S901). It is assumed that the number of servers 3 in STEP S901 is the number of servers which is in operation and storing the retrieving target data.

The control unit 18 determines whether or not to continue the system operation (STEP S902). In STEP S902, the control unit 18 determines whether or not to continue the system operation based on, for example, an operation period set in advance by the administrator. In a case of not continuing the system operation (NO in STEP S902), the control unit 18 ends the processing. In a case of continuing the system operation (YES in STEP S902), the control unit 18 determines to continue the system operation for one month (STEP S903). In this case, the control unit 18 notifies the server 3 of continuing the system operation via the communication unit 11.

The acquisition unit 12 acquires the data amount in each server 3 (STEP S904). For example, the acquisition unit 12 inquires the server 3 via the communication unit 11 to acquire the data amount in the cache memory. The data amount acquired in STEP S904 is assumed to be only the data amount of the retrieving target data.

The control unit 18 determines whether or not the number of servers can be increased in month i (STEP S905). The number of servers means the number of servers in which the retrieving target data is stored. Whether or not the number of servers can be increased is set by, for example, the administrator in advance, and the control unit 18 determines whether or not the number of servers can be increased by checking the set content.

In a case where the number of servers can be increased (YES in STEP S905), the process proceeds to the data distribution processing to a new server (STEP S906). In a case where the number of servers is not able to be increased (NO in STEP S905), the process proceeds to the data distribution processing to the other server which is in operation (STEP S907).

Detailed processing in STEP S906 is similar to the detailed processing in STEP S107 in the first embodiment (refer to FIGS. 5, 6, and 9), and the description thereof will be omitted. In addition, detailed processing in STEP S907 is similar to the detailed processing in STEP S108 in the first embodiment (refer to FIGS. 11 and 12), and the description thereof will be omitted.

In the first embodiment, in each processing in STEP S302 in FIG. 6, in STEP S504 in FIG. 9, and in STEP S802 in FIG. 12, the data amount in a case where the current data is divided is calculated based on the past distribution result. In the second embodiment, as illustrated in FIG. 15, since the uniformity ratio differs in every month, for example, each processing described above refers to the distribution result of the same month of the previous year.

In addition, for example, in a case where the tendency of the uniformity ratio differs in every day, in each processing in STEP S302 in FIG. 6, in STEP S504 in FIG. 9, and in STEP S802 in FIG. 12, each processing may be performed referring to the uniformity ratio of the same day of the previous week.

That is, in the second embodiment, in a case where the data amount differs according to the time for each condition when dividing the data by each of the plurality of conditions, the calculation unit 13 selects the past result information acquired for performing the calculation based on the time of performing the distribution.

As described above, in the second embodiment, in a case where the uniformity ratio differs according to the time, since each processing is performed referring to the past result considering the time, it is possible to select the appropriate attribute. In this way, it is possible to suppress the disproportion of the processing load among the plurality of servers.

An Example of a Hardware Configuration of the Data Distribution Device

Figure 16:
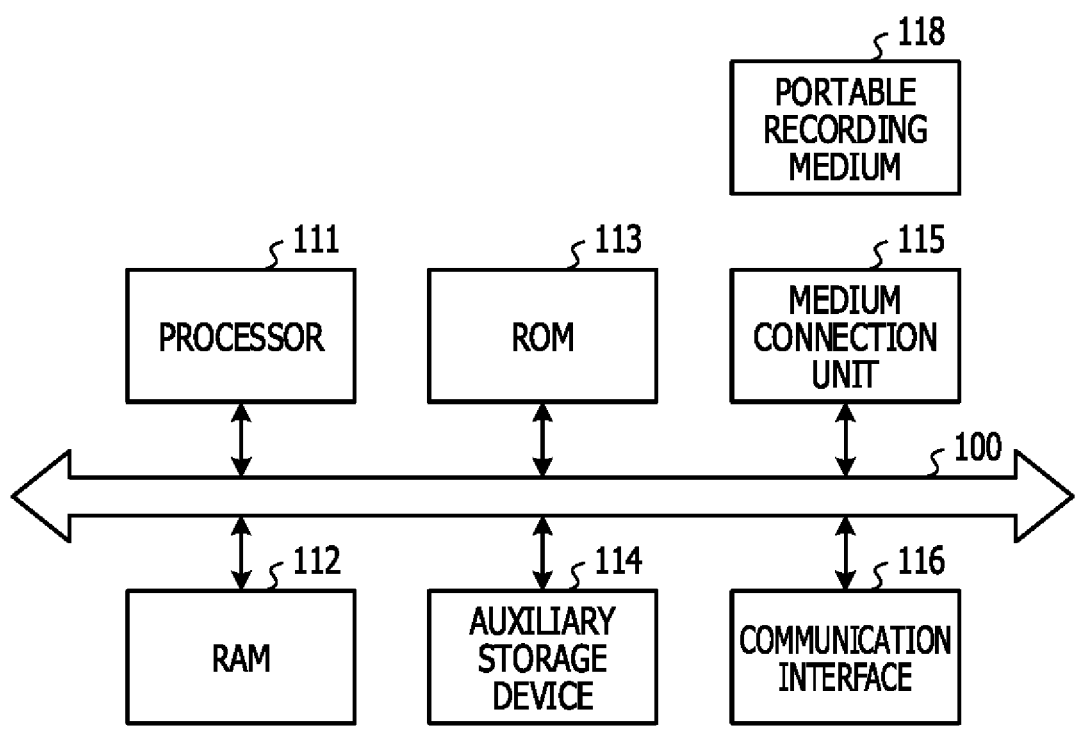
FIG. 16 is a diagram illustrating an example of a hardware configuration of the data distribution device.

Next, an example of a hardware configuration of the data distribution device will be described with reference to FIG. 16. As illustrated in FIG. 16, a processor 111, a random access memory (RAM) 112, and a read only memory (ROM) 113 are connected to a bus 100. In addition, an auxiliary storage device 114, a medium connection unit 115, and a communication interface 116 are connected to the bus 100.

The processor 111 executes a program developed on the RAM 112. A data distribution program that performs the processing items in the embodiments may be applied as the program to be executed.

The ROM 113 is a non-volatile storage device that stores the program developed on the RAM 112. The auxiliary storage device 114 is a storage device that stores various information items, and for example, a hard disk drive, a semiconductor memory, or the like may be applied as the auxiliary storage device 114. The medium connection unit 115 is provided so as to be connected to a portable recording medium 118.

A portable memory, an optical disc (for example, a compact disc (CD) or a digital versatile disc (DVD)), a semiconductor memory, or the like may be applied as the portable recording medium 118. The data distribution program that performs the processing items in the embodiments may be recorded in the portable recording medium 118.

The storage unit 17 illustrated in FIG. 2 may be realized by the RAM 112, the auxiliary storage device 114, or the like. The communication unit 11 illustrated in FIG. 2 may be realized by the communication interface 116. The acquisition unit 12, the calculation unit 13, the selection unit 14, the generation unit 15, the distribution unit 16, and the control unit 18 illustrated in FIG. 2 may be realized by the processor 111 executing the given data distribution program.

Any of the RAM 112, the ROM 113, the auxiliary storage device 114, or the portable recording medium 118 is an example of a tangible and computer-readable storage medium. These tangible storage media are not a temporary medium such as a signal carrier wave.

Others

The present embodiment is not limited to the embodiments described above, and various configurations or embodiments can be adopted within the range of no departing from the gist of the present embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a data distribution program that causes a computer to execute a process, the process comprising:
    calculating a first value relating to a data amount of a specified information processing device included in a plurality of information processing devices, each of a plurality of pieces of data being stored in any of the plurality of information processing devices;
    when the first value exceeds a reference, calculating each of a plurality of data amounts of a plurality of data groups for each of a plurality of attributes used to divide the plurality of pieces of data into the plurality of data groups, the plurality of pieces of data including a key and a value corresponding to the key, and the key including the plurality of attributes;

selecting a specified attribute from the plurality of attributes based on the plurality of data amounts; and distributing, to another information processing device included in the plurality of information processing devices, any of the plurality of data groups divided based on the specified attribute.

2. The non-transitory computer-readable storage medium according to claim 1, wherein the process comprises:

acquiring an allowable storage amount of the another information processing device when the data amount of the specified information processing device exceeds the reference; and selecting the specified attribute based on the plurality of data amounts and the acquired allowable storage amount.

3. The non-transitory computer-readable storage medium according to claim 1, wherein the process comprises:

selecting the specified attribute such that a uniformity ratio indicating a degree of uniformity of the plurality of data amounts of the plurality of data groups classified based on the specified attribute becomes equal to or higher than a predetermined uniformity reference; and distributing any of the plurality of data groups to a newly used information processing device.

4. The non-transitory computer-readable storage medium according to claim 1, wherein the process comprises:

selecting the specified attribute based on a second value relating to a ratio of data amount of the specified information processing device to a data amount of an information processing device of which the data amount is smaller than a predetermined threshold value; and distributing any of the plurality of data groups to a newly used information processing device when a third value relating to the plurality of data amounts of the plurality of data groups does not exceed the reference.

5. The non-transitory computer-readable storage medium according to claim 4, wherein the process comprises:

reselecting the specified attribute based on the third value when the third value exceeds the reference;

dividing the plurality of pieces of data stored in the specified information processing device into a plurality of data groups based on the reselected attribute; and distributing any of the plurality of data groups classified based on the reselected attribute to a newly used information processing device when the third value relating to the plurality of data groups divided based on the reselected attribute does not exceed the reference.

6. The non-transitory computer-readable storage medium according to claim 1, wherein the process comprises:

selecting the specified attribute in which a difference between the data amount of the specified information processing device and the data amount of the another information processing device is equal to or smaller than a difference reference in a case where any of the plurality of data groups, divided based on the specified attribute, is distributed to the another information processing device from the specified information processing device.

7. The non-transitory computer-readable storage medium according to claim 1, wherein the process comprises:

acquiring past result information based on a time of performing the distributing, the past result information is used for the calculating each of the plurality of data amounts.

8. A data distribution method executed by a computer coupled to a plurality of information processing devices, the data distribution method comprising:

calculating a first value relating to a data amount of a specified information processing device included in a plurality of information processing devices, each of a plurality of pieces of data being stored in any of the plurality of information processing devices;

when the first value exceeds a reference, calculating each of a plurality of data amounts of a plurality of data groups for each of a plurality of attributes used to divide the plurality of pieces of data into the plurality of data groups, the plurality of pieces of data including a key and a value corresponding to the key, and the key including the plurality of attributes;

selecting specified attribute from the plurality of attributes based on the plurality of data amounts; and distributing, to another information processing device included in the plurality of information processing devices, any of the plurality of data groups divided based on the specified attribute.

9. A data distribution device comprising:

a memory; and a processor coupled to the memory and the processor configured to:

calculate a first value relating to a data amount of a specified information processing device included in a plurality of information processing devices, each of a plurality of pieces of data being stored in any of the plurality of information processing devices;

when the first value exceeds a reference, calculate each of a plurality of data amounts of a plurality of data groups for each of a plurality of attributes used to divide the plurality of pieces of data into the plurality of data groups, the plurality of pieces of data including a key and a value corresponding to the key, and the key including the plurality of attributes;

select specified attribute from the plurality of attributes based on the plurality of data amounts; and distribute, to another information processing device included in the plurality of information processing devices, any of the plurality of data groups divided based on the specified attribute.

* * * * *